United States Patent [19]

Rourke

[11] 4,315,050

[45] Feb. 9, 1982

[54] LAMINATES STRUCTURE OF AN EXPANDED CORE PANEL AND A FLAT SHEET OF MATERIAL WHICH DOES NOT EASILY BOND AND A PROCESS FOR MAKING THE SAME

[75] Inventor: Rosemary Rourke, Newton, Conn.

[73] Assignee: Norfield Corporation, Danbury, Conn.

[21] Appl. No.: 115,338

[22] Filed: Jan. 25, 1980

[51] Int. Cl.³ .................. B32B 3/12; B29C 27/12
[52] U.S. Cl. .................. 428/116; 156/197; 156/292; 156/306.6; 156/308.2; 156/309.6; 264/164; 264/248; 264/249; 264/259
[58] Field of Search ............ 264/321, 248, 249, 259, 264/164, 41, 54; 428/116; 156/308.2, 309.6, 309.9, 197, 292, 306.6

[56] References Cited

U.S. PATENT DOCUMENTS

| | | | |
|---|---|---|---|
| 272,033 | 2/1883 | Edge | 264/249 X |
| 2,502,304 | 3/1950 | Baker | 264/41 X |
| 2,994,110 | 8/1961 | Hardy | 264/321 X |
| 3,007,834 | 11/1961 | Moeller et al. | 48/116 X |
| 3,025,200 | 3/1962 | Powers | 264/54 X |
| 3,462,330 | 8/1969 | Greig et al. | 428/116 X |
| 3,473,991 | 10/1969 | Ludwig | 156/309.9 X |
| 3,509,005 | 4/1970 | Hartig | 428/116 X |
| 3,821,051 | 6/1974 | Withers | 428/116 X |
| 3,919,379 | 11/1975 | Smarook | 428/116 X |
| 3,919,380 | 11/1975 | Smarook et al. | 428/116 X |
| 3,919,381 | 11/1975 | Smarook | 264/259 X |
| 3,919,382 | 11/1975 | Smarook | 428/116 X |
| 3,919,445 | 11/1975 | Smarook | 428/116 |
| 3,919,446 | 11/1975 | Smarook | 428/116 |
| 4,113,909 | 9/1978 | Beasley | 428/116 |

FOREIGN PATENT DOCUMENTS 6202 12/1903 Denmark .......................... 264/249

OTHER PUBLICATIONS

Muus, Laurits Ta;N. Gerard McCrum and Frank C. McGrew, "On the Relationship of Physical Properties to Structure in Linear Polymers of Ethylene and Propylene," In *Spe Journal*, May 1959, pp. 368–372.

*Primary Examiner*—Philip Anderson
*Attorney, Agent, or Firm*—Kenyon & Kenyon

[57] ABSTRACT

A method of bonding a sheet of hard to bond thermoformable material to a core made of expanded thermoformable material is disclosed. The sheet of thermoformable material is heated to its glass transition temperature and then pressed into voids in the core forming a mechanical bond in addition to the chemical bond.

14 Claims, 2 Drawing Figures

LAMINATES STRUCTURE OF AN EXPANDED CORE PANEL AND A FLAT SHEET OF MATERIAL WHICH DOES NOT EASILY BOND AND A PROCESS FOR MAKING THE SAME

BACKGROUND OF THE INVENTION

This invention relates to the lamination of plastic materials in general and more particularly to a method for laminating an expanded core to flat sheets of materials which do not easily bond. Certain plastic materials are particularly useful in chemical applications because of their excellent chemical resistance. A particular example is polypropylene which has bound much use in chemical tanks, plating tanks, tanks for aeromatic fluids and gasoline. The typical procedure is to weld together a number of solid polypropylene plates to, for example, a thickness of one and one half inches. Such an arrangement results in a heavy sheet of material which is costly.

A method of expanding plastic materials to form relatively large expanded panels is disclosed in U.S. Pat. No. 4,113,909, granted to Donald R. Beasely and assigned to the Norfield Corporation. The technique used is one developed by Walter Smarook and described in more detail in a series of patents referred to in the aforementioned U.S. Patent. In this method a sheet of plastic material is placed between platens containing a plurality of vented openings. The platens are heated and the plastic material adheres to the plates because of hot tack adhesion. The platens are moved apart and due to the venting by the vented openings, the plastic takes on a new internal geometry, and expanded panels results after the necessary cooling. The panel is structurally strong and of light weight with honeycomb like internal structure, i.e., a plurality of voids surrounded by rib members of polypropylene. While the structural strength and light weight of the panels make them ideal for use in chemical tanks or the like, the honeycomb like internal structure could result in leakage. For this reason it is desirable to bond flat sheets of material such as polypropylene to the polypropylene core. However, it is well known that polypropylene does not bond easily and there are no known bonding agents which can be used to achieve a structural bond. Polypropylene which is manufactured in relatively thin sheets is formed into thicker sheets by a heating process which fuses the layers together. Such a heating process is the only known way to bond polypropylene to itself and has been used in the welding of corners in tanks. Although spot welding of the polypropylene sheets to the core might be possible, the bond which is obtained in not reliable and may result in leakage from one void in the core to another. Such leakage, particularly in the use of volatile material can cause serious problems. Thus, a better method of bonding is required.

SUMMARY OF THE INVENTION

It is the object of the present invention to provide a method for bonding flat sheets of a material, which is difficult to bond with bonding agents, to a core of the same material.

The present invention provides a solution to this problem. In accordance with the present invention, a core of the expanded material such as polypropylene is sandwiched between at least one sheet of polypropylene and placed between two flat platens in a press. The core of expanded material has a plurality of voids defined by ribs made of the core material. The cross section of the ribs are shaped somewhat like an I-Beam, having a substantially horizontal portion and a substantially vertical portion. The overall thickness of the sandwich is made somewhat greater than the thickness desired in the end. Heat and pressure are applied raising the temperature of the polypropylene to the polypropylene melting point. The temperature profile is carefully controlled so that melting occurs only in the sheet and at the surface of contact between the sheets and the core. Otherwise, due to the pressure and heat a complete collapse of the core could occur. Materials such as polypropylene go quickly from the solid to the liquid state making close control of temperature particulary important. Generally, the more pressure applied the less heat and time of application of the heat that is required. Heat is maintained for a short period and then a gradual cooling takes place. The platens in the press are controlled to come together to the desired final thickness. As the material of the flat sheet reaches its melting point the material flows into the voids in the core and around the horizontal portion of the ribs in a mushroom like fashion. This creates, in addition to a welding or fusion at the point of contact between the core and sheet material, a strong mechanical bond due to the interlocking of the sheet material and the ribs, resulting in a tight integral structure which is approximately one third the weight of previously used solid panels, but of the same strength.

DETAILED DESCRIPTION OF THE INVENTION

Figure 1:
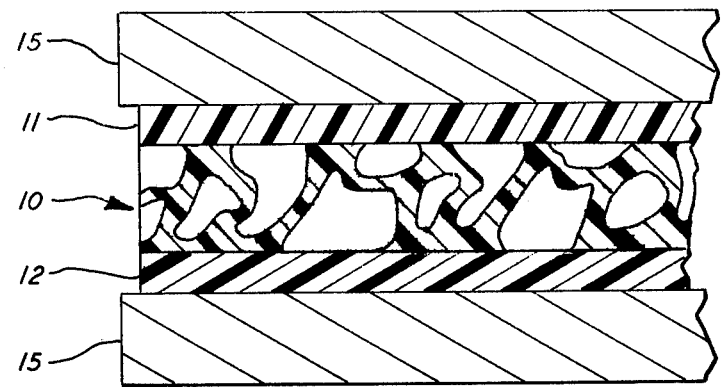
FIG. 1 shows a cross section across a core of polypropylene sandwiched between two sheets of the same material before the process of the invention is applied.

In accordance with the present invention, as illustrated in FIG. 1, a sandwich is formed with an expanded core of a material 10 such as polypropylene between two sheets 11 and 12 of the same material. This sandwich is placed between two platens 15 capable of being heated and contained in a press. The press is controllable to close down the platens to a predetermined thickness. The overall thickness of the sandwich is selected to be from one eighth to one quarter inch greater than the desired final thickness. For example, one might start with ⅞ inch core and two ⅛ inch sheet or skins with the press set to squeeze it to one inch. The plates 15 are heated to a temperature of for example, between 350° and 420° F., the latter representing the melting temperature of polypropylene. At this temperature only a small amount of pressure is required. If it is desired to use a lower temperature a greater amount of pressure is required the increased pressure lowering the melting point. In accordance with the present invention, the platens are heated to this temperature over a period of approximately one and a half minutes. The temperature is maintained for about two and half minutes whereafter gradual cooling over a period of approximately 10 minutes is carried out. Typically, the material will start out at a temperature of 100° F., be raised to a temperature of 430° F. in 1-½ minutes, held at this temperature for two and half minutes and then cooled back down to 100° F. for a period of 10 minutes. Typically, the pressure applied will be the pressure developed by the weight of the press platen which is about 800 pounds.

Figure 2:
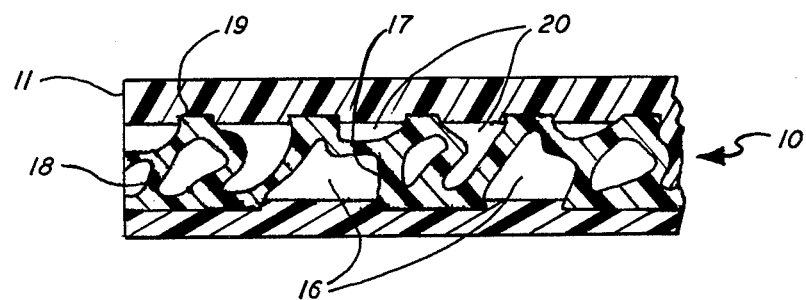
FIG. 2 shows a cross section of the product of the invention after the process of the invention is applied.

FIG. 2 shows a cross section through a portion of the material made according to the process of the present invention. Shown is a sectional portion of the core 10 and a section through the outer sheets 11 and 12. The expanded core 10 has a plurality of voids 16 defined by ribs 17 made of the core material. These ribs have a substantially vertical portion 18 and a substantially horizontal portion 19. During the process of the present invention, material from the sheet 11 and 12 is forced into the void 16 in the expanded core and flows around the substantially horizontal portions 19 of adjacent ribs 17. As the sheets are cooled, the portion of the material that has flowed into the voids 16 harden into a mushroom shaped plug 20. The result is not only a welding or fusion at the point of contact between the core 10 and the sheet 11 and 12 but also a mechanical interlock at the substantially horizontal portion 19 by the mushroom shaped plug 20. As a result a particularly strong and integral structure in which the flat sheet cannot be pulled away from the core results, furthermore, when used as a wall of a chemical tank, should a leak develop at the point 17, and fill the void 19, the construction prevents migration of the leaking chemical to adjacent voids in the expanded material.

It should be understood that while the embodiment described utilizes a sandwich formed by a core disposed between two sheets, the process is equally applicable to bonding only one sheet on the core. In that case the heat and pressure are supplied to the platen that has the sheet of material to be bonded.

Additionally, other thermoplastic materials other than polypropylene may be used in this method.

What is claimed is:

1. A method of forming a composite member having a panel of expanded thermoformable material with a plurality of voids, as a core and at least one sheet of the same material attached thereto, comprising the steps of:
   disposing at least one face portion of a layer of expanded thermoformable material adjacent to a face portion of a layer of a sheet of same material;
   disposing the layers between two platens of a press;
   heating at least one platen adjacent to the sheet of the same material to its melting temperature at the point of contact between said layers;
   moving said presses together thereby squeezing material from the sheet of the same material into voids of said expanded thermoformable material;
   cooling said at least one platen; and
   removing said composite member from said platnes.

2. The method according to claim 1 whrein at least some of said voids in said thermoformable material have a portion recessed with respect to said face portion whereby when said material from said sheet is squeezed into said voids and cools, it will form a mechanical interlock therewith.

3. A method according to claim 1 wherein said step of disposing at least one face portion of a layer of expanded thermoformable material comprises the step of disposing both face portions of a layer of expanded thermoformable material adjacent a layer of a sheet of the same material.

4. A method according to claim 3 wherein said step of heating comprises heating both platens and said step of cooling comprises cooling both platens.

5. A method according to claim 1 wherein said material is polypropylene and wherein said step of heating said platen comprises the steps of: p1 raising the temperature of the platen from temperature of approximately 100° F. to a temperature of approximately 430° F. in about 1½ minutes; and
   holding the temperature at 430° F. for about 2½ minutes.

6. A method in accordance with claim 5 wherein said step of cooling comprises:
   lowering the temperature to about 100° F. over a priod of approximately 10 minutes.

7. A method in accordance with claim 4 wherein said material is polypropylene and said step of heating said platens comprises the steps of:
   raising the temperature of the pltens from temperature of approximately 100° F. to a temperature of approximately 430° F. in about 1½ minutes; and
   holding the temperature at 430° F. for about 2½ minutes.

8. A method in accordance with claim 7 wherein said step of cooling comprises the step of lowering the temperature to about 100° F. over a period of approximately 10 minutes.

9. A method in accordance with claim 1 further comprising the steps of:
   determining the desired cross sectional thickness of the composite member; and
   selecting the panel of expanded thermoformable material and the at least one sheet of the same material to have a combined cross sectional thickness of approximately ⅛ to ¼ inch more than the desired cross sectional thickness of the composite member.

10. A composite member comprising:
    a panel of expanded thermoformable material having a plurality of voids, each of said voids having an opening on at least one surface of said expanded panel, said opening having an area smaller than an interior cross sectional area of said void; and
    at least one layer of hard to bond thermoformable material attached to said panel and having a plurality of projections into said voids, and each of said projections having a cross sectional area at the interior of said voids which is greater than the area of said openings made by the method of claim 1.

11. The composite member of claim 10 having openings at both surfaces.

12. The composite member of claim 11 having two layers of hard to bond thermoformable material.

13. The composite member of claim 10 wherein said expanded panel is made of polypropylene.

14. The composite member of claim 10 wherein said layer of hard to bond thermoformable materal is a layer of polypropylene.

* * * * *